US012750600B2

(12) United States Patent
Ding et al.

(10) Patent No.: US 12,750,600 B2
(45) Date of Patent: Sep. 29, 2026

(54) DETECTION SUBSTRATE, NOISE REDUCTION METHOD THEREFOR AND DETECTION APPARATUS

(71) Applicants: Beijing BOE Sensor Technology Co., Ltd., Beijing (CN); BOE Technology Group Co., Ltd., Beijing (CN)

(72) Inventors: Zhi Ding, Beijing (CN); Xuecheng Hou, Beijing (CN); Zhenyu Wang, Beijing (CN); Jinyu Li, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 113 days.

(21) Appl. No.: 18/614,540

(22) Filed: Mar. 22, 2024

(65) Prior Publication Data

US 2024/0236522 A1 Jul. 11, 2024

Related U.S. Application Data

(63) Continuation of application No. PCT/CN2021/139116, filed on Dec. 17, 2021.

(51) Int. Cl.
*H04N 25/677* (2023.01)
*H04N 25/77* (2023.01)
(Continued)

(52) U.S. Cl.
CPC ........... *H04N 25/677* (2023.01); *H04N 25/77* (2023.01); *H04N 25/779* (2023.01)

(58) Field of Classification Search
CPC ...... H04N 25/77; H04N 25/677; H04N 25/79; H04N 25/30; H10F 30/20; H10F 39/189;
(Continued)

(56) References Cited

U.S. PATENT DOCUMENTS 10,339,885 B2 * 7/2019 Um .......................... G09G 3/36
11,404,469 B2 * 8/2022 Zhang ................... H10F 39/803
(Continued)

FOREIGN PATENT DOCUMENTS

CN 103779362 A * 5/2014 ........... H01L 27/146
CN 108073004 A 5/2018
(Continued)

OTHER PUBLICATIONS

PCT/CN2021/139116 international search report dated Aug. 23, 2022.

*Primary Examiner* — Marly S Camargo
(74) *Attorney, Agent, or Firm* — IPro, PLLC

(57) ABSTRACT

A detection substrate, a noise reduction method therefor and a detection device are disclosed. The detection substrate includes a base substrate, the base substrate including a noise reduction region; a plurality of first photosensitive devices in the noise reduction region; a plurality of reading lines and a plurality of scanning lines, where the plurality of reading lines and the plurality of scanning lines are arranged in different layers from the plurality of first photosensitive devices, and the plurality of reading lines and the plurality of scanning lines are in different layers and crossing over each other; and a plurality of first transistors in the noise reduction region, where the first transistor is disconnected from at least one of the first photosensitive device, the reading line or the scanning line.

19 Claims, 22 Drawing Sheets

(51) Int. Cl.
*H04N 25/779* (2023.01)
*H10F 30/20* (2025.01)

(58) Field of Classification Search
CPC .... H10F 39/8037; H10F 30/29; H10F 30/301; H10F 39/89; H10F 39/195
See application file for complete search history.

(56) References Cited

U.S. PATENT DOCUMENTS

| | | | | |
|---|---|---|---|---|
| 2018/0357973 | A1* | 12/2018 | Um | G02F 1/136286 |
| 2021/0288101 | A1* | 9/2021 | Zhang | H10F 39/803 |
| 2022/0236428 | A1* | 7/2022 | Li | H10F 39/195 |
| 2022/0375974 | A1* | 11/2022 | Meng | H10F 39/8037 |
| 2024/0341161 | A1* | 10/2024 | Hai | H10K 59/353 |

FOREIGN PATENT DOCUMENTS

| | | | | | |
|---|---|---|---|---|---|
| CN | 110660816 | A | | 1/2020 | |
| CN | 112002721 | A | | 11/2020 | |
| CN | 113130698 | A | | 7/2021 | |
| CN | 113130698 | B | * | 1/2023 | G02F 1/13338 |
| JP | 2006202984 | A | | 8/2006 | |

* cited by examiner

DETECTION SUBSTRATE, NOISE REDUCTION METHOD THEREFOR AND DETECTION APPARATUS

CROSS-REFERENCE TO RELATED APPLICATIONS

This application is a continuation application of International Application No. PCT/CN2021/139116, filed on Dec. 17, 2021, which is hereby incorporated by reference in its entirety.

TECHNICAL FIELD

The present disclosure relates to the technical field of photoelectric detection, and in particular to a detection substrate, a noise reduction method therefor, and a detection device.

BACKGROUND

X-ray inspection technology is widely used in industrial non-destructive testing, container scanning, circuit board inspection, medical treatment, security, industry and other fields, and has broad application prospects. Traditional X-Ray imaging technology belongs to analog signal imaging, which has a low resolution and a poor image quality. The X-ray digital radiography (DR) technology that appeared in the late 1990s uses X-ray flat panel detectors to directly convert X-ray images into digital images, because the converted digital images are clear, having a high resolution, and easy to save and transmit, the X-ray DR technology has become a hot research topic at present.

SUMMARY

The present disclosure provides a detection substrate, a noise reduction method therefor, and a detection device.

In an aspect, embodiments of the present disclosure provide a detection substrate, including:

a base substrate, including a noise reduction region;

a plurality of first photosensitive devices in the noise reduction region;

a plurality of reading lines and a plurality of scanning lines, wherein the plurality of reading lines and the plurality of scanning lines are arranged in different layers from the plurality of first photosensitive devices, and the plurality of reading lines and the plurality of scanning lines are in different layers and crossing over each other; and a plurality of first transistors in the noise reduction region, wherein the first transistor is disconnected from at least one of the first photosensitive device, the reading line or the scanning line.

In some embodiments, in the above detection substrate according to embodiments of the present disclosure, at least one of a gate, a first electrode or a second electrode of the first transistor is floating.

In some embodiments, in the above detection substrate according to embodiments of the present disclosure, the gate of the first transistor is electrically connected with the scanning line, the first electrode of the first transistor is electrically connected with the first photosensitive device, and the second electrode of the first transistor is floating.

In some embodiments, in the above detection substrate according to embodiments of the present disclosure, the gate of the first transistor is electrically connected with the scanning line, the first electrode of the first transistor is floating, and the second electrode of the first transistor is electrically connected with the reading line.

In some embodiments, in the above detection substrate according to embodiments of the present disclosure, the gate of the first transistor is floating, the first electrode of the first transistor is electrically connected with the first photosensitive device, and the second electrode of the first transistor is electrically connected with the reading line.

In some embodiments, in the above detection substrate according to embodiments of the present disclosure, the gate, the first electrode and the second electrode of the first transistor are all floating.

In some embodiments, in the above detection substrate according to embodiments of the present disclosure, at least one of the gate, the first electrode or the second electrode of the first transistor is absent.

In some embodiments, in the above detection substrate according to embodiments of the present disclosure, the gate of the first transistor is electrically connected with the scanning line, the first electrode of the first transistor is electrically connected with the first photosensitive device, and the second electrode of the first transistor is absent.

In some embodiments, in the above detection substrate according to embodiments of the present disclosure, the gate of the first transistor is electrically connected with the scanning line, the first electrode of the first transistor is absent, and the second electrode of the first transistor is electrically connected with the reading line.

In some embodiments, in the above detection substrate according to embodiments of the present disclosure, the gate of the first transistor is absent, the first electrode of the first transistor is electrically connected with the first photosensitive device, and the second electrode of the first transistor is electrically connected with the reading line.

In some embodiments, in the above detection substrate according to embodiments of the present disclosure, the gate, the first electrode and the second electrode of the first transistor are all absent.

In some embodiments, in the above detection substrate according to embodiments of the present disclosure, the base substrate further includes a photosensitive region, and the noise reduction region is located on at least one side of the photosensitive region in an extending direction of the reading line;

a single reading line is located in the noise reduction region or the photosensitive region, and each of the scanning lines runs through the photosensitive region and the noise reduction region.

In some embodiments, in the above detection substrate according to embodiments of the present disclosure, the base substrate further includes a photosensitive region, and the noise reduction region is located on at least one side of the photosensitive region in an extending direction of the scanning line;

each of the reading lines runs through the noise reduction region and the photosensitive region, and the plurality of scanning lines are located in the photosensitive region.

In some embodiments, in the above detection substrate according to embodiments of the present disclosure, the detection substrate further includes a plurality of second photosensitive devices and a plurality of second transistors in the photosensitive region, wherein a gate of the second transistor is electrically connected with the scanning line, a first electrode of the second transistor is electrically connected with the second photosensitive device, and a second electrode of the second transistor is electrically connected with the reading line.

In another aspect, embodiments of the present disclosure provide a noise reduction method of the above detection substrate, including:

collecting at least one of a coupled noise signal of the scanning line or a self-noise signal of the reading line through the reading line; and performing noise reduction processing on a photoelectric signal of the detection substrate based on the at least one of the coupled noise signal of the scanning line or the self-noise signal of the reading line.

In another aspect, embodiments of the present disclosure provide a detection device, including the above detection substrate according to embodiments of the present disclosure.

DETAILED DESCRIPTION

Figure 1:
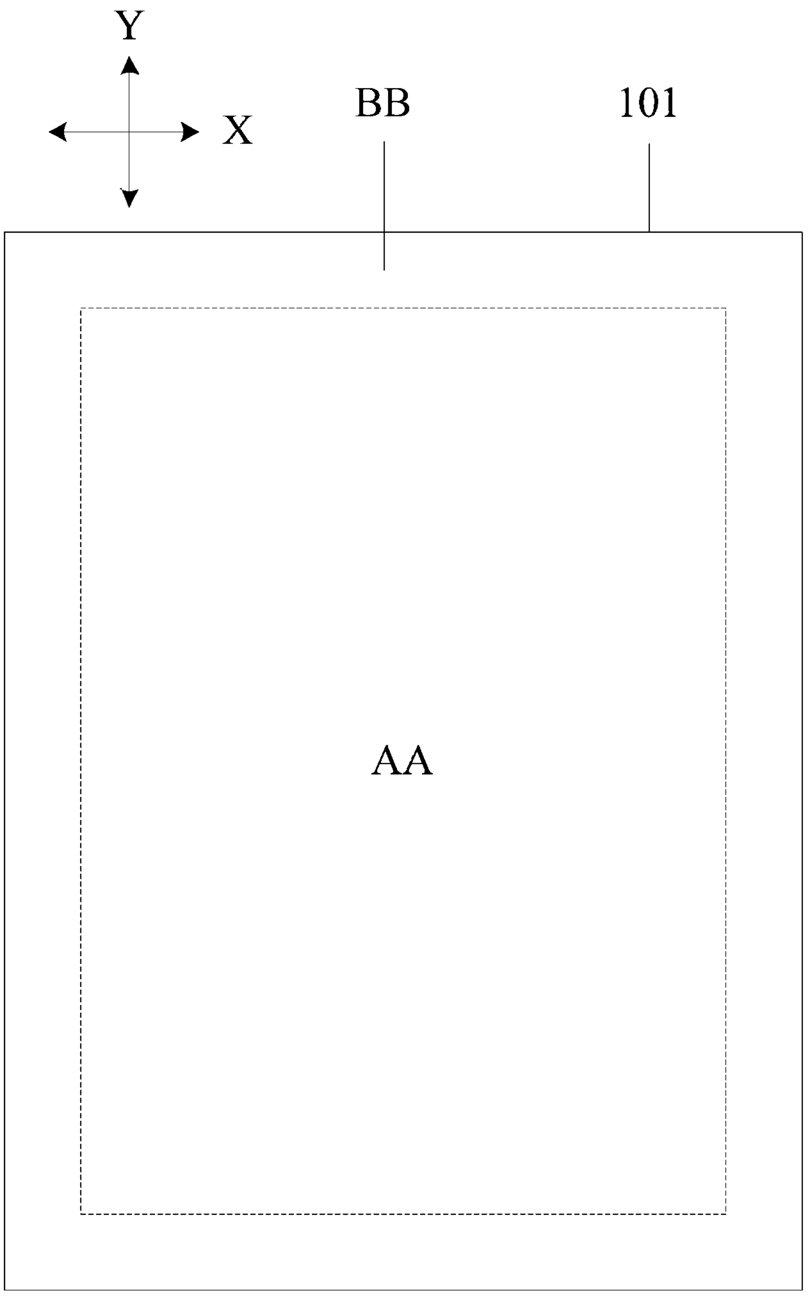
FIG. 1 is a schematic structural diagram of a detection substrate according to an embodiment of the present disclosure.

In order to make the purpose, technical solutions and advantages of the embodiments of the present disclosure clearer, the technical solutions of the embodiments of the present disclosure will be clearly and completely described below in conjunction with the accompanying drawings of the embodiments of the present disclosure. It should be noted that the size and shape of each figure in the drawings do not reflect the true scale, but are only intended to illustrate the present disclosure. And the same or similar reference numerals represent the same or similar elements or elements having the same or similar functions throughout.

Unless otherwise defined, the technical terms or scientific terms used herein shall have the usual meanings understood by those having ordinary skill in the art to which the present disclosure belongs. "First", "second" and similar words used in the present disclosure and claims do not indicate any order, quantity or importance, but are only used to distinguish different components. "Comprising" or "including" and similar words mean that the elements or items appearing before the word include the elements or items listed after the word and their equivalents, without excluding other elements or items. "Inner", "outer", "upper", "lower" and so on are only used to express the relative positional relationship, when the absolute position of the described object changes, the relative positional relationship may also change accordingly.

The X-ray flat panel detector includes reading lines and scanning lines crossing over each other. Because there is a coupling capacitance between the scanning lines and the reading lines due to the crossing, the reading lines will collect a photoelectric signal while collecting a coupled noise signal on the scanning lines; and, the reading lines themself will also generate certain noise, which will affect the image quality. If the noise on the scanning lines and the reading lines can be accurately read out, then the noise can be eliminated through the subsequent image processing algorithms, thereby improving image quality. In addition, in the related art, a metal layer is used to block a photosensitive device in a noise reduction region, so that it cannot sense light, to improve image quality. However, since the photosensitive device still has leakage current in the dark state, which has a certain impact on the gray value of the image, moreover, the metal layer cannot completely block all visible light, so that the photosensitive device will still produce a certain response and generate electrical signals, which will also have a certain impact on image quality.

Figure 2:
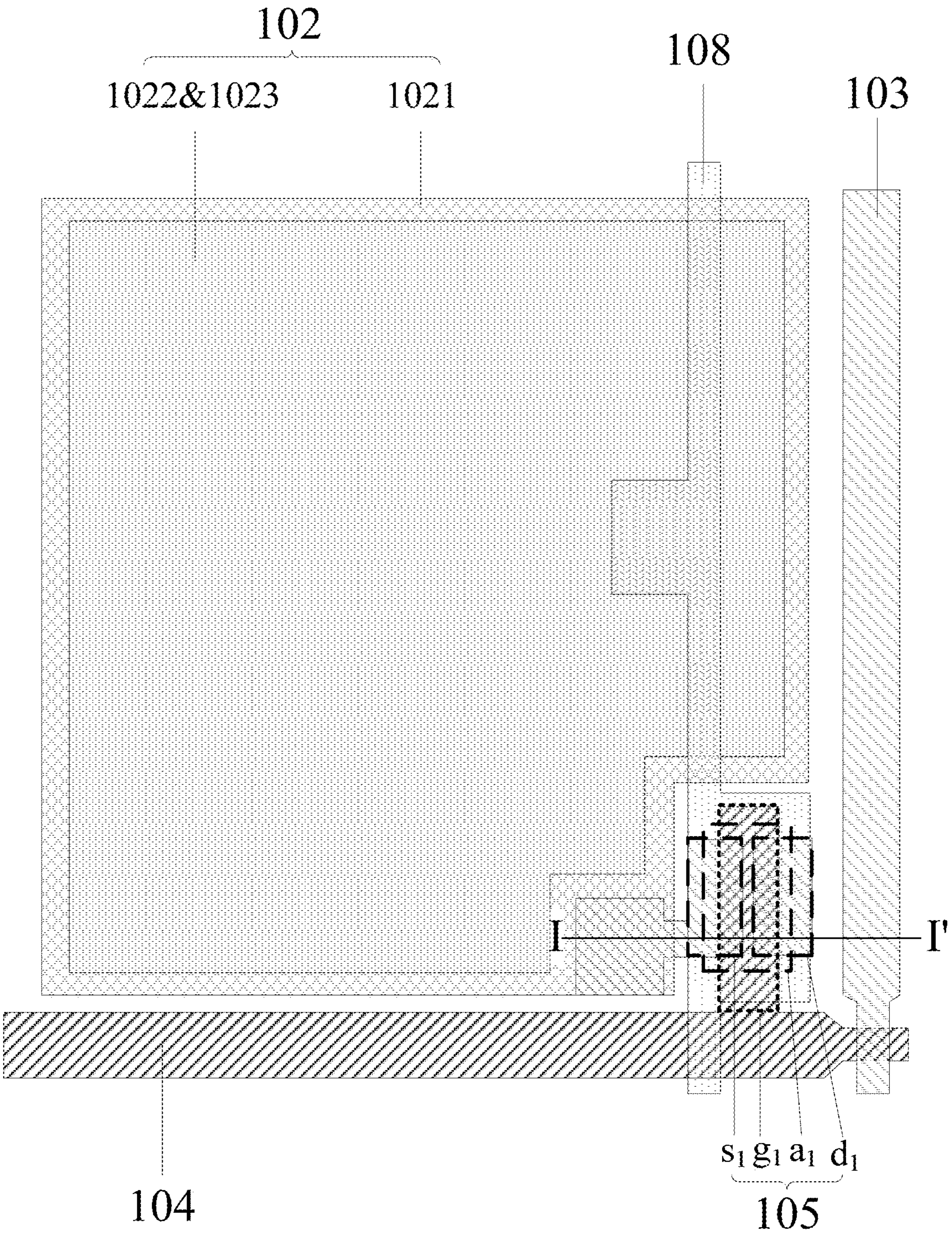
FIG. 2 is a schematic structural diagram of a noise reduction pixel in a noise reduction region in FIG. 1.
Figure 3:
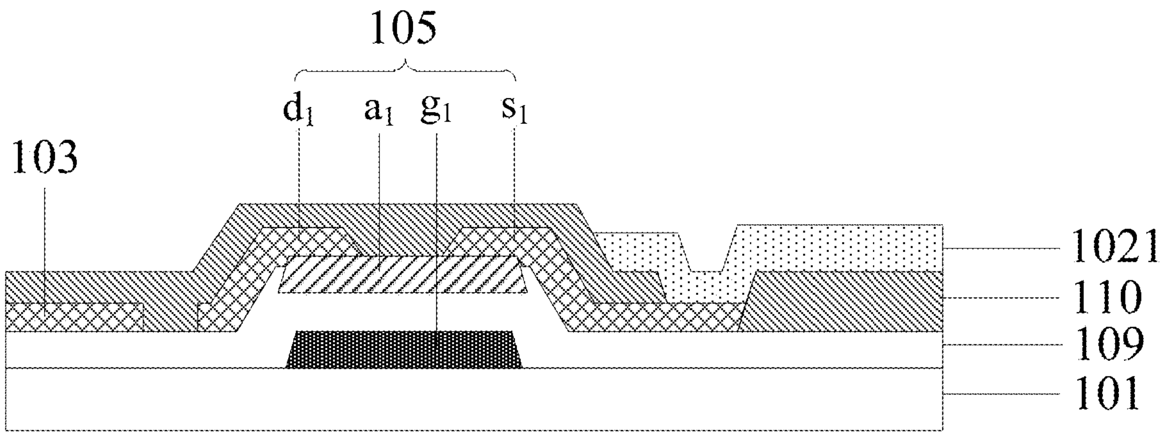
FIG. 3 is a sectional view along I-I' line in FIG. 2.

In order to alleviate the above-mentioned technical problems existing in the related art, an embodiment of the present disclosure provides a detection substrate, as shown in FIG. 1 to FIG. 3, including:

a base substrate 101, including a noise reduction region BB;

a plurality of first photosensitive devices 102 in the noise reduction region BB;

a plurality of reading lines 103 and a plurality of scanning lines 104, where the plurality of reading lines 103 and the plurality of scanning lines 104 are arranged in different layers from the plurality of first photosensitive devices 102, and the plurality of reading lines 103 and the plurality of scanning lines 104 are in different layers and crossing over each other; and a plurality of first transistors 105 in the noise reduction region BB, where the first transistor 105 is disconnected from at least one of the first photosensitive device 102, the reading line 103 or the scanning line 104.

In the above detection substrate according to an embodiment of the present disclosure, a gate $g_1$, a first electrode $s_1$, and a second electrode $d_1$ of the first transistor 105 are processed, so that the first transistor 105 cannot normally conduct the first photosensitive device 102 and the reading line 103, the first transistor 105 is disconnected from at least one of the first photosensitive device 102, the reading line 103 or the scanning line 104, the leakage current of the first photosensitive device 102 in the dark state will not be read out, the signal read by the reading line 103 is completely the coupled noise signal of the scanning line 104; by not setting the scanning line 104 in the noise reduction region BB, the first transistor 105 is disconnected from the scanning line 104, the leakage current of the first photosensitive device 102 in the dark state will not be read out, and the signal read by the reading line 103 is the self-noise signal of the reading line 103. Subsequently, the image processing method in the related art is used to eliminate the coupled noise signal of the scanning line 104 and the self-noise signal of the reading line 103, which can effectively avoid the impact of the first photosensitive device 102, the reading line 103 and the scanning line 104 on image quality, to further significantly improve image quality.

In some embodiments, in the above detection substrate according to embodiments of the present disclosure, the first photosensitive device 102 may include a bottom electrode 1021, a photoelectric conversion structure 1022, and a top electrode 1023 that are stacked, where the photoelectric conversion structure 1022 may be a PN structure or a PIN structure. The PIN structure 1022 includes an N-type semiconductor layer with N-type impurities, an intrinsic semiconductor layer without impurities (also called an I-type semiconductor layer), and a P-type semiconductor layer with P-type impurities, which are sequentially stacked on the bottom electrode 1021. Here, a thickness of the intrinsic semiconductor layer can be greater than a thickness of the P-type semiconductor layer and a thickness of the N-type semiconductor layer, the top electrode 1023 and the photoelectric conversion structure 1022 can be prepared by one mask process, and an orthographic projection of the top electrode 1023 on the base substrate 101 is located within an orthographic projection of the photoelectric conversion structure 1022 on the base substrate 101, that is, an area of the top electrode 1023 is slightly smaller than an area of the photoelectric conversion structure 1022, for example, a distance between an edge of the top electrode 1023 and an edge of the photoelectric conversion structure 1022 may be set to 1 μm to 3 μm, such as 1.0 μm, 1.5 μm, 1.8 μm, 2.0 μm, 2.5 μm, 3.0 μm and so on. Through the above setting, the leakage current caused by the etching damage of the sidewall of the photoelectric conversion structure 1022 can be reduced.

Optionally, the first transistor 105 may be an amorphous silicon transistor, a polysilicon transistor, an oxide transistor, etc., which is not limited herein. The first transistor 105 may be a top-gate transistor, a bottom-gate transistor, a double-gate transistor, etc., which is not limited herein. The first electrode $s_1$ of the first transistor 105 is the source and the second electrode $d_1$ is the drain, or the first electrode $s_1$ of the first transistor 105 is the drain and the second electrode $d_1$ is the source, which will not be distinguished here.

In some embodiments, in the detection substrate according to embodiments of the present disclosure, as shown in FIG. 2 to FIG. 9, at least one of the gate $g_1$, the first electrode $s_1$ or the second electrode $d_1$ of the first transistor 105 is set floating. Here, the floating of the gate $g_1$ of the first transistor 105 refers to that the gate $g_1$ of the first transistor 105 is independent from the scanning line 104; the floating of the first electrode $s_1$ of the first transistor 105 refers to that the first electrode $s_1$ of the first transistor 105 is independent from the first photosensitive device 102 (the bottom electrode of the first photosensitive device 102); the floating of the second electrode $d_1$ of the first transistor 105 refers to that the second electrode $d_1$ of the first transistor 105 is independent from the reading line 103. In this way, by setting at least one of the gate $g_1$, the first electrode $s_1$ or the second electrode $d_1$ of the first transistor 105 floating, the technical effect of the first transistor 105 being disconnected from at least one of the first photosensitive device 102, the reading line 103 or the scanning line 104 can be achieved.

Figure 4:
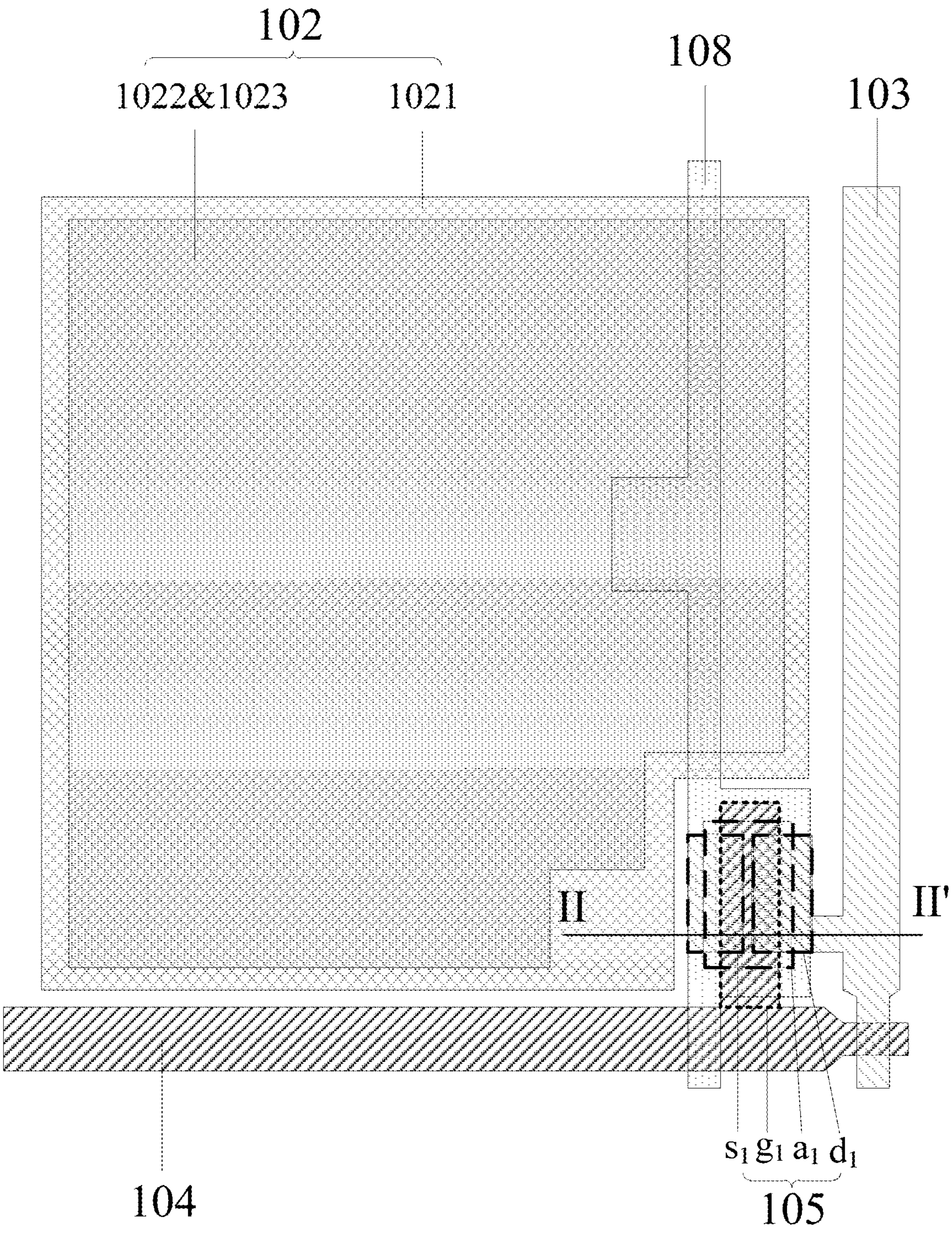
FIG. 4 is a schematic structural diagram of a noise reduction pixel in the noise reduction region in FIG. 1.
Figure 5:
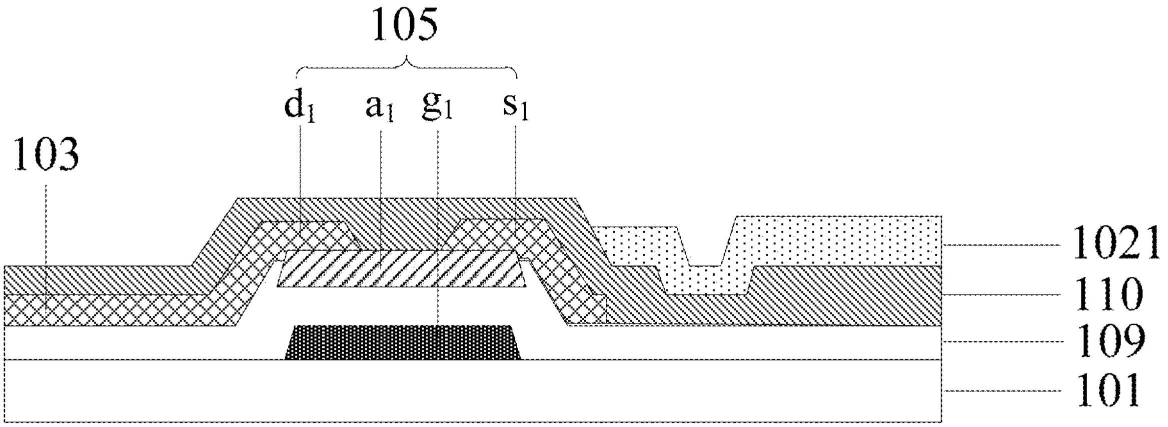
FIG. 5 is a sectional view along II-II' line in FIG. 4.
Figure 6:
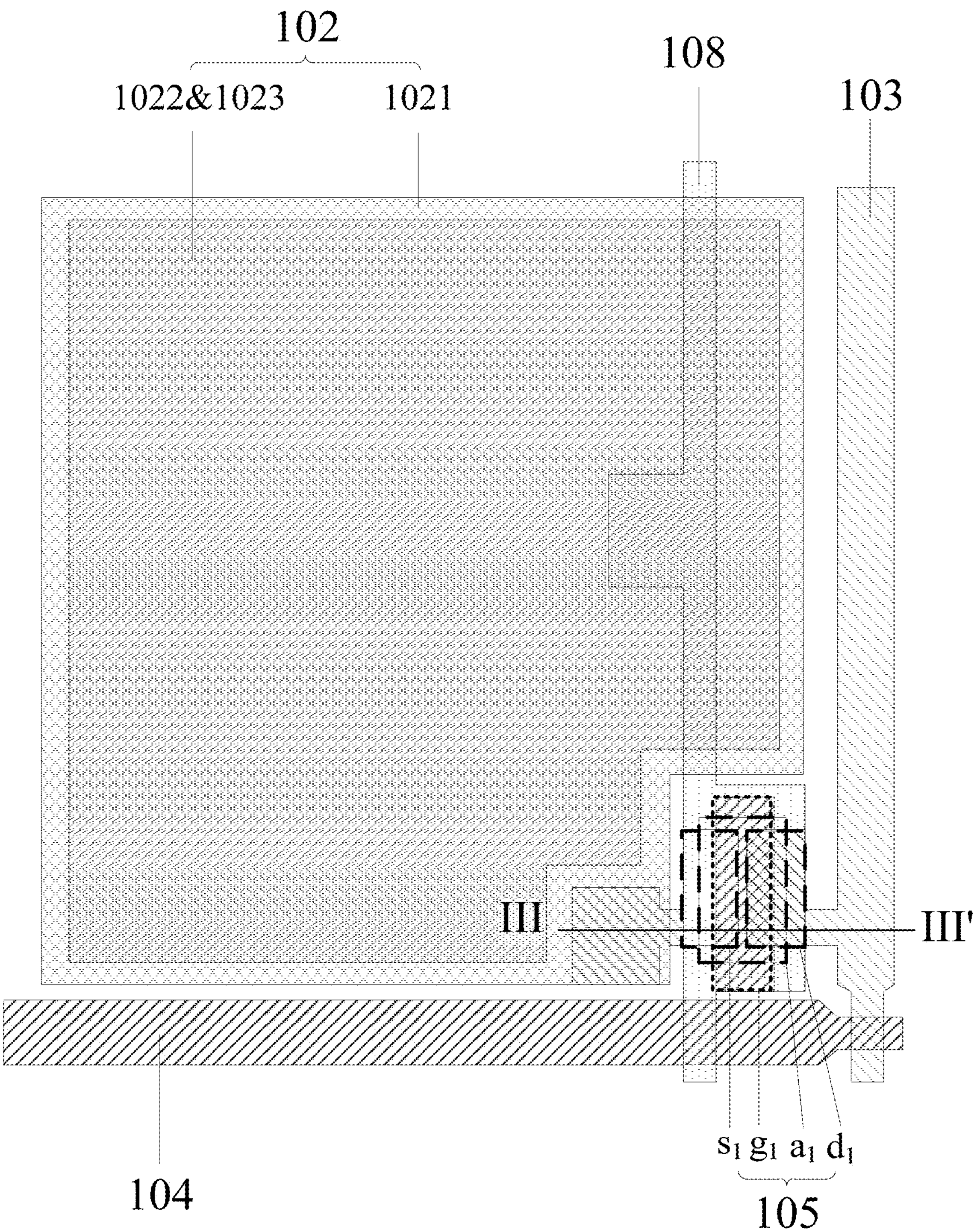
FIG. 6 is a schematic structural diagram of a noise reduction pixel in the noise reduction region in FIG. 1.
Figure 7:
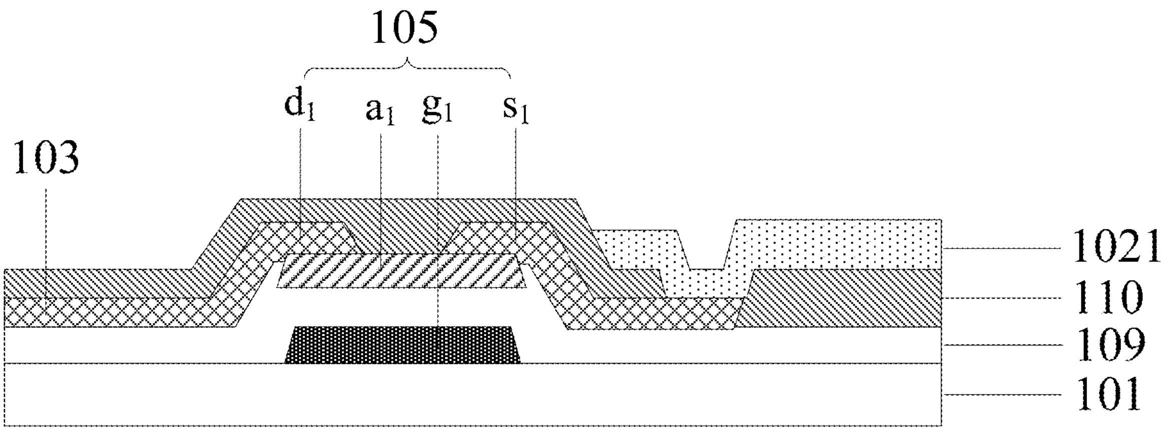
FIG. 7 is a sectional view along line III-III' in FIG. 6.
Figure 8:
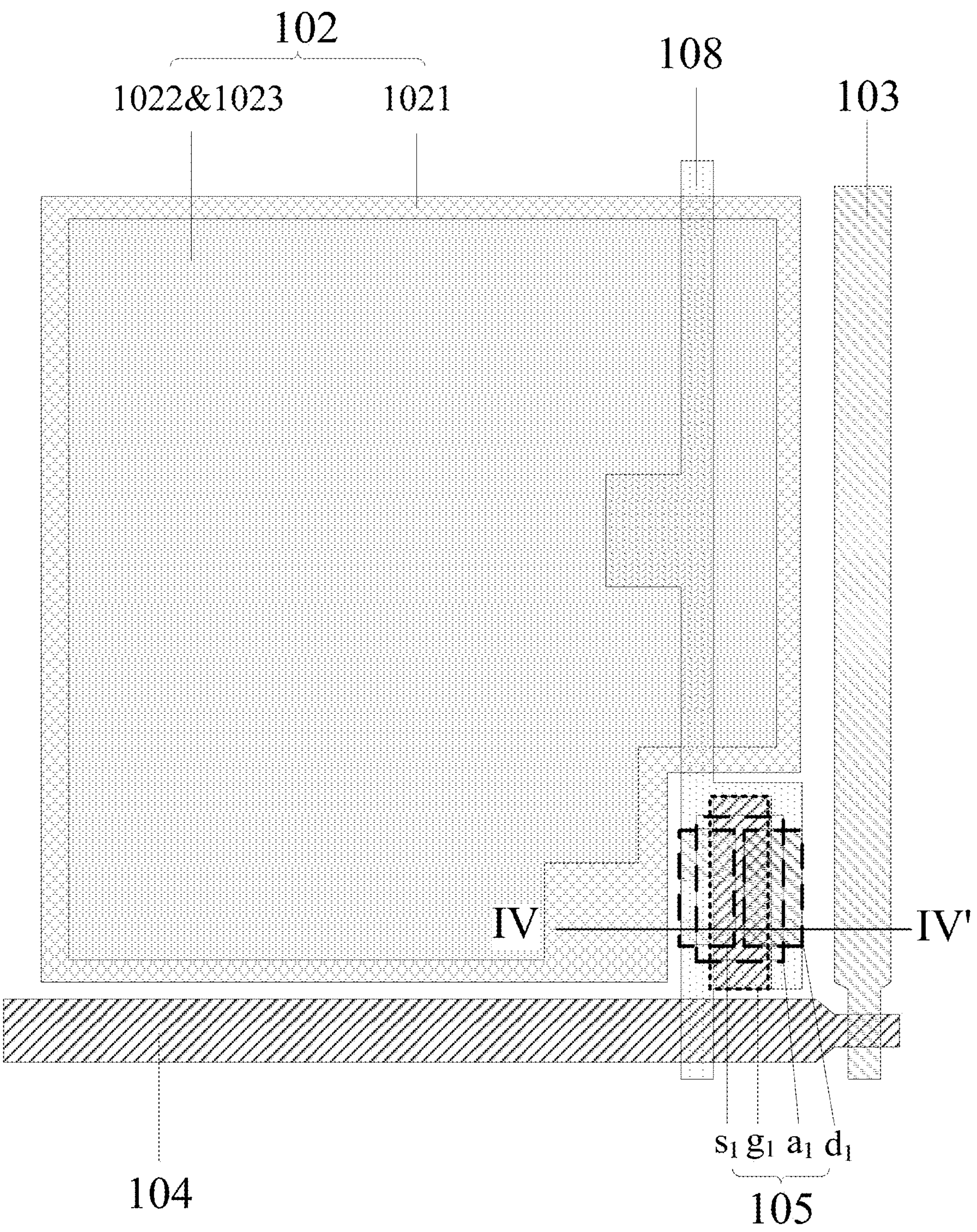
FIG. 8 is a schematic structural diagram of a noise reduction pixel in the noise reduction region in FIG. 1.
Figure 9:
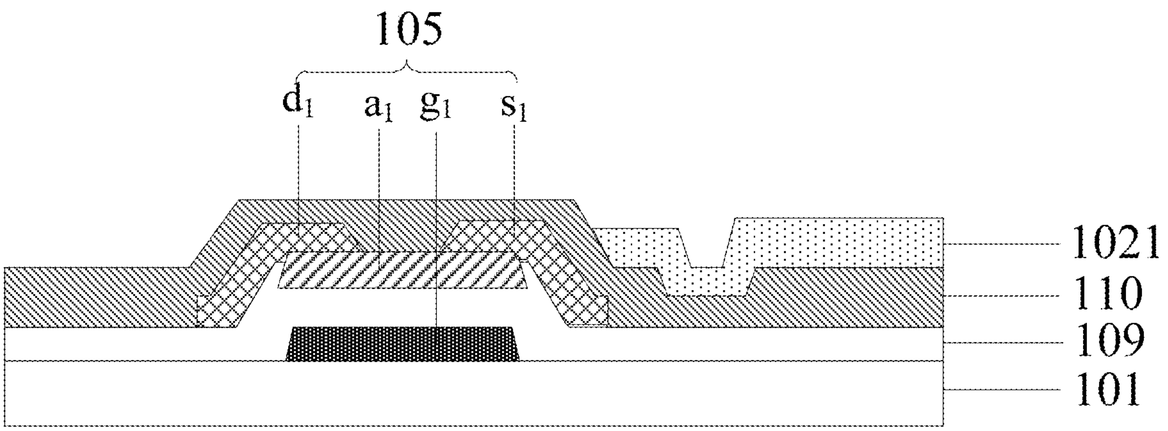
FIG. 9 is a sectional view along line IV-IV' in FIG. 8.

In some embodiments, in the detection substrate according to embodiments of the present disclosure, at least one of the gate $g_1$, the first electrode $s_1$ or the second electrode $d_1$ of the first transistor 105 is floating, which may include the following possible implementations: as shown in FIG. 2 and FIG. 3, the gate $g_1$ of the first transistor 105 is electrically connected with the scanning line 104, the first electrode $s_1$ of the first transistor 105 is electrically connected with the first photosensitive device 102, and the second electrode $d_1$ of the first transistor 105 is floating; as shown in FIG. 4 and FIG. 5, the gate $g_1$ of the first transistor 105 is electrically connected with the scanning line 104, the first electrode $s_1$ of the first transistor 105 is floating, and the second electrode $d_1$ of the first transistor 105 is electrically connected with the reading line 103; as shown in FIG. 6 and FIG. 7, the gate $g_1$ of the first transistor 105 is floating, and the first electrode $s_1$ of the first transistor 105 is electrically connected with the first photosensitive device 102, and the second electrode $d_1$ of the first transistor 105 is electrically connected with the reading line 103; as shown in FIG. 8 and FIG. 9, the gate $g_1$, the first electrode $s_1$ and the second electrode $d_1$ of the first transistor 105 are all floating. Of course, in actual implementation, any two of the gate $g_1$, the first electrode $s_1$ and the second electrode $d_1$ of the first transistor 105 may also be floating, which is not limited here.

In some embodiments, in the display substrate according to embodiments of the present disclosure, as shown in FIG. 10 to FIG. 17, at least one of the gate $g_1$, the first electrode $s_1$, or the second electrode $d_1$ of the first transistor 105 is set absent. Here, the gate $g_1$ of the first transistor 105 is absent, referring to that the absence of the gate $g_1$ of the first transistor 105 causes the first transistor 105 to be disconnected from the scanning line 104; the first electrode $s_1$ of the first transistor 105 is absent, referring to that the absence of the first electrode $s_1$ of the first transistor 105 causes the first transistor 105 to be disconnected from the first photosensitive device 102; the second electrode $d_1$ of the first transistor 105 is absent, referring to that the absence of the second electrode $d_1$ of the first transistor 105 causes the first transistor 105 to be disconnected from the reading line 103. In this way, by setting at least one of the gate $g_1$, the first electrode $s_1$ or the second electrode $d_1$ of the first transistor 105 to be absent, the technical effect of the first transistor 105 being disconnected from at least one of the first photosensitive device 102, the reading line 103 or the scanning line 104 can be achieved.

Figure 10:
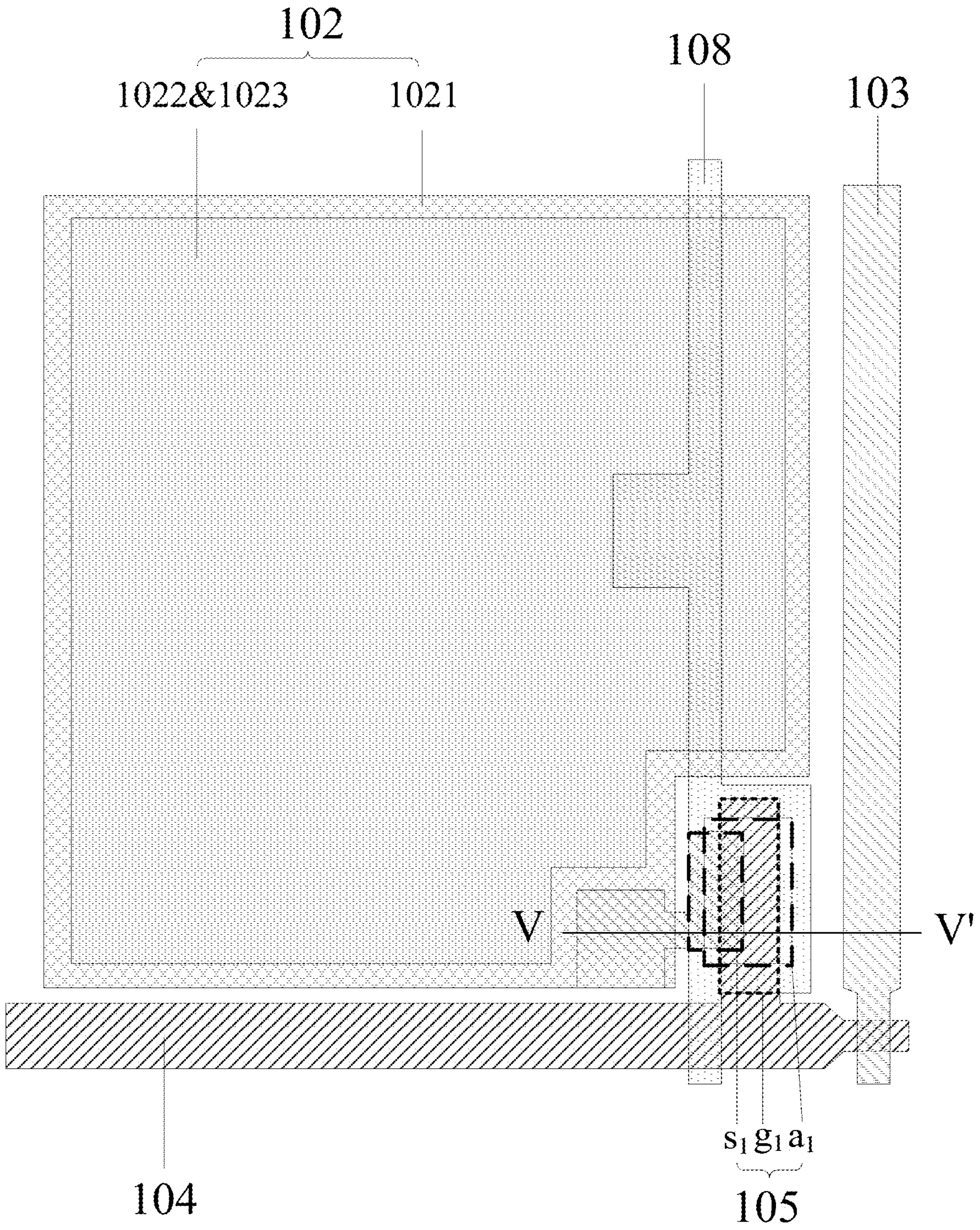
FIG. 10 is a schematic structural diagram of a noise reduction pixel in the noise reduction region in FIG. 1.
Figure 11:
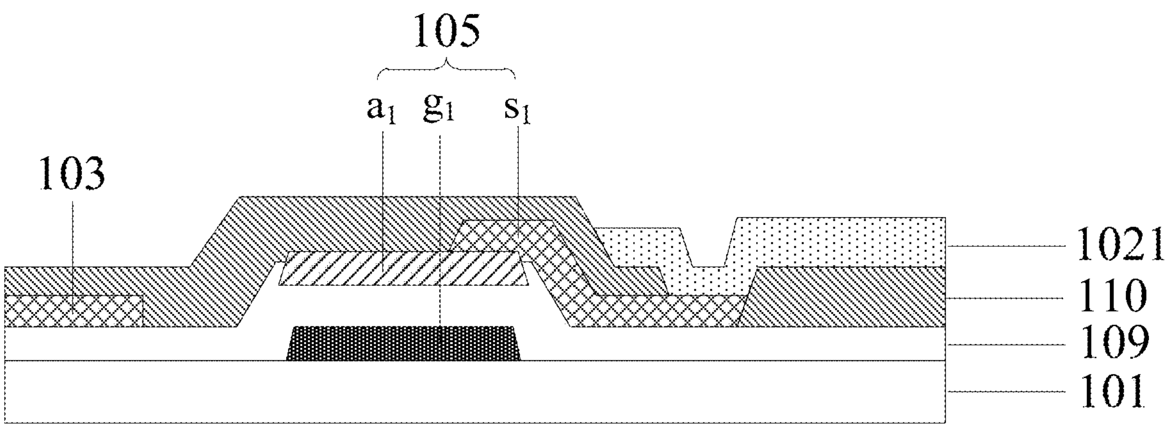
FIG. 11 is a sectional view along the line V-V' in FIG. 10.
Figure 12:
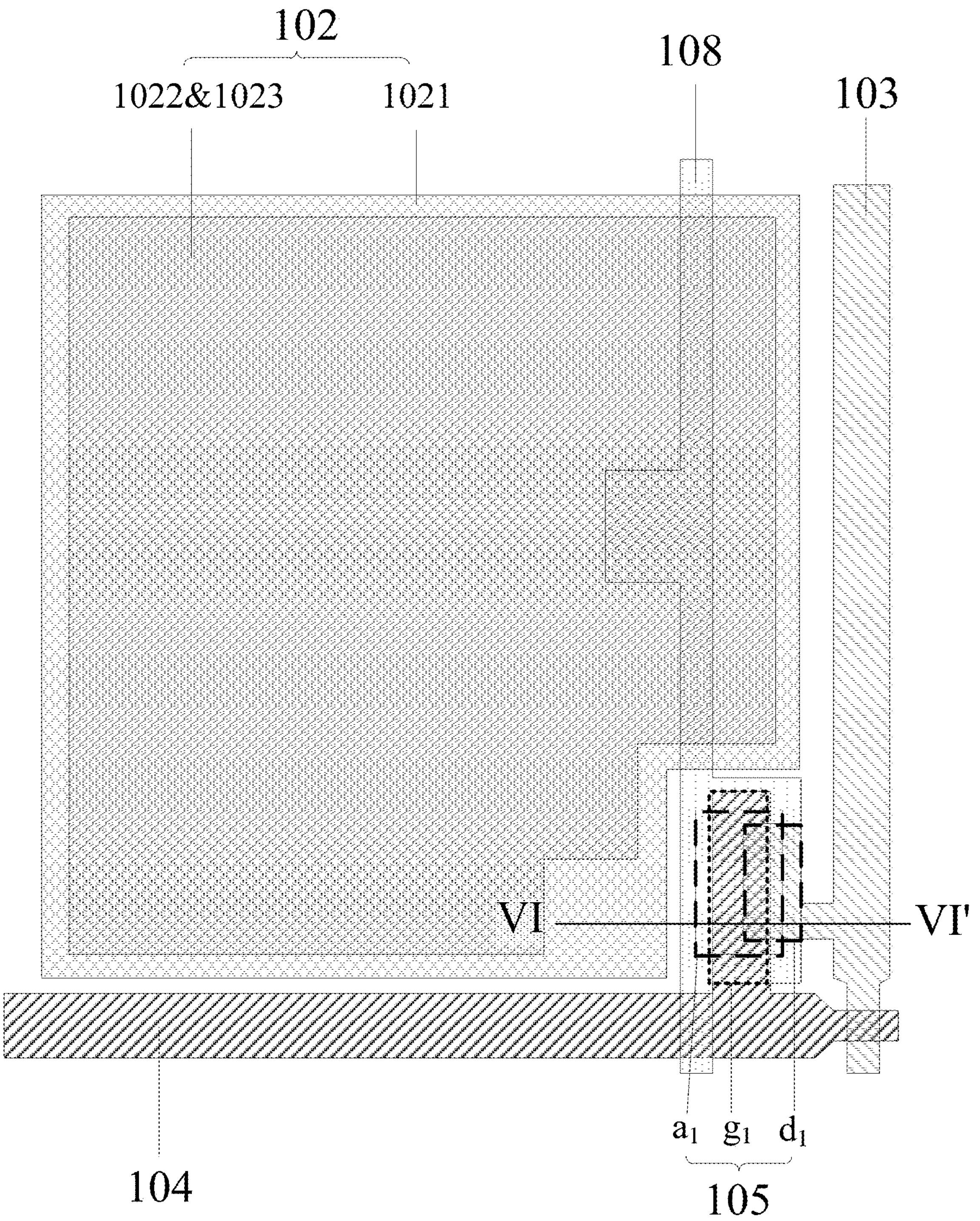
FIG. 12 is a schematic structural diagram of a noise reduction pixel in the noise reduction region in FIG. 1.
Figure 13:
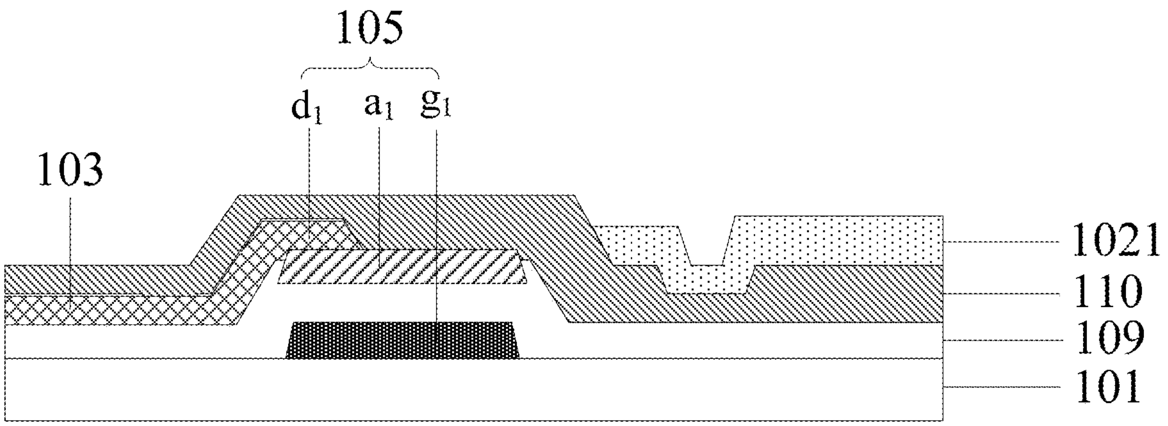
FIG. 13 is a sectional view along VI-VI' line in FIG. 12.
Figure 14:
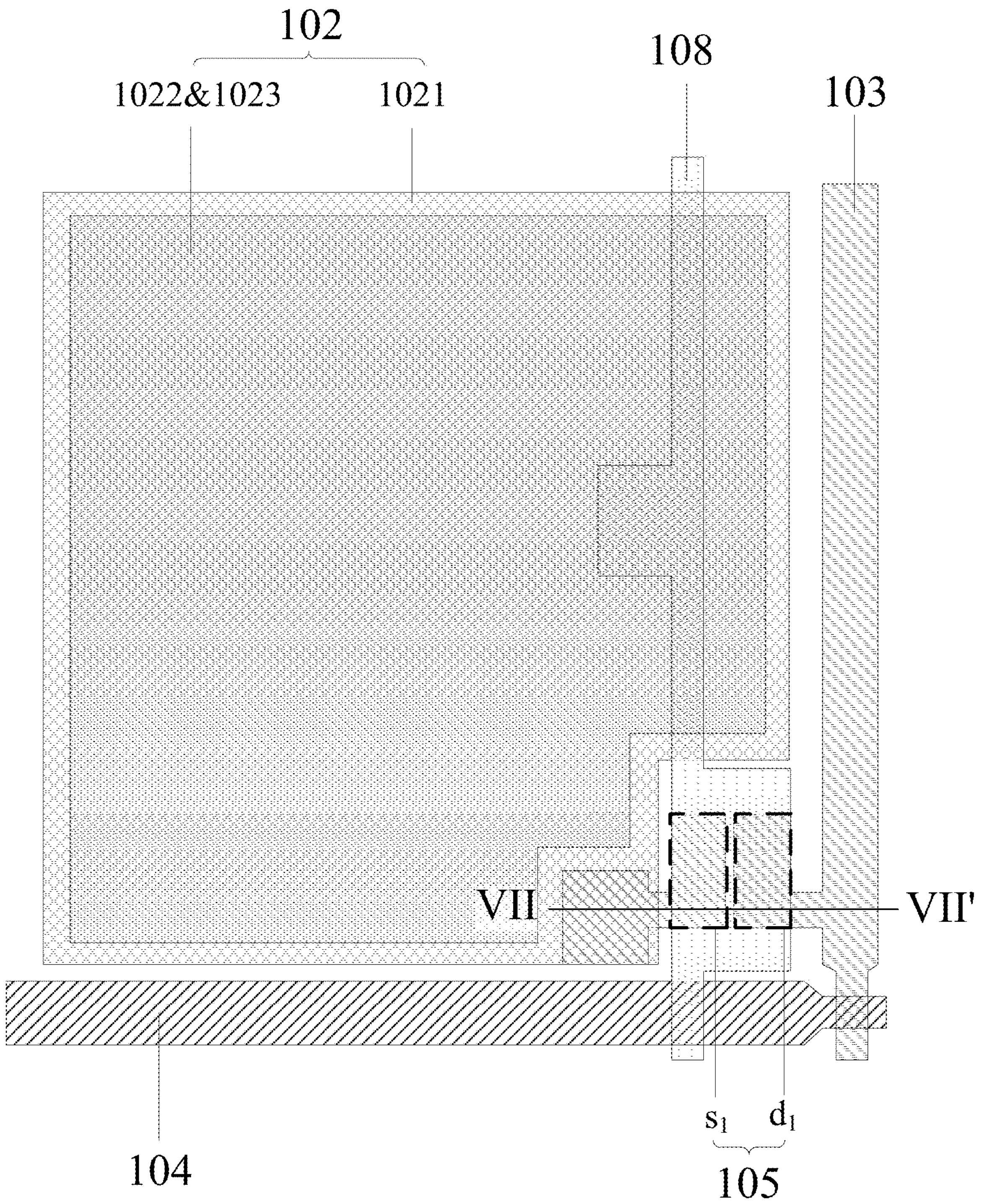
FIG. 14 is a schematic structural diagram of a noise reduction pixel in the noise reduction region in FIG. 1.
Figure 15:
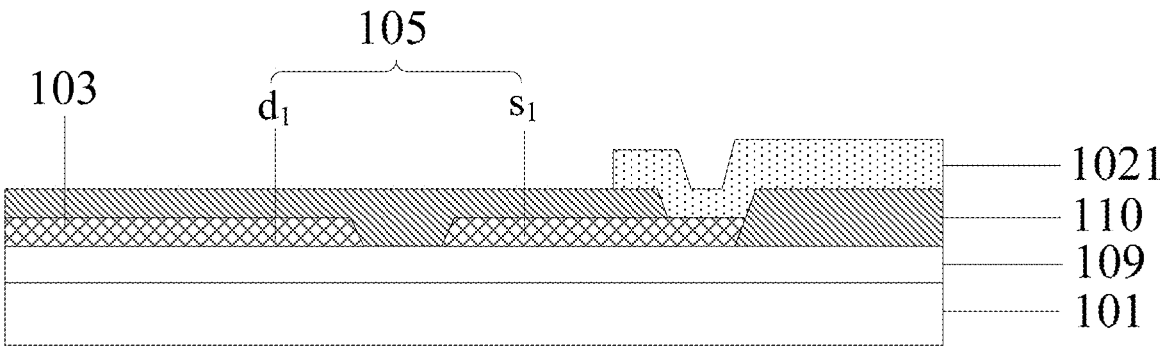
FIG. 15 is a sectional view along line VII-VII' in FIG. 14.
Figure 16:
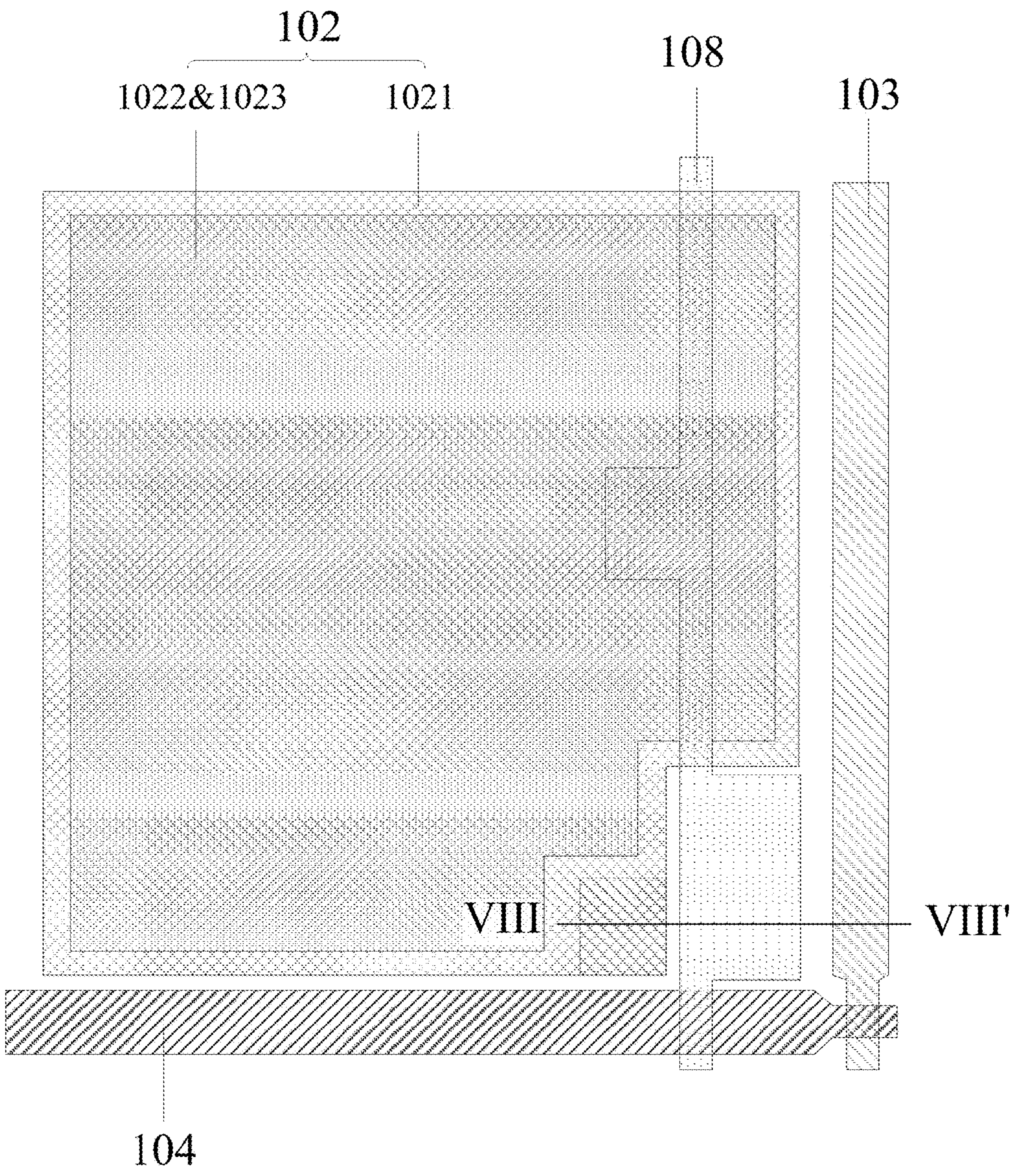
FIG. 16 is a schematic structural diagram of a noise reduction pixel in the noise reduction region in FIG. 1.
Figure 17:
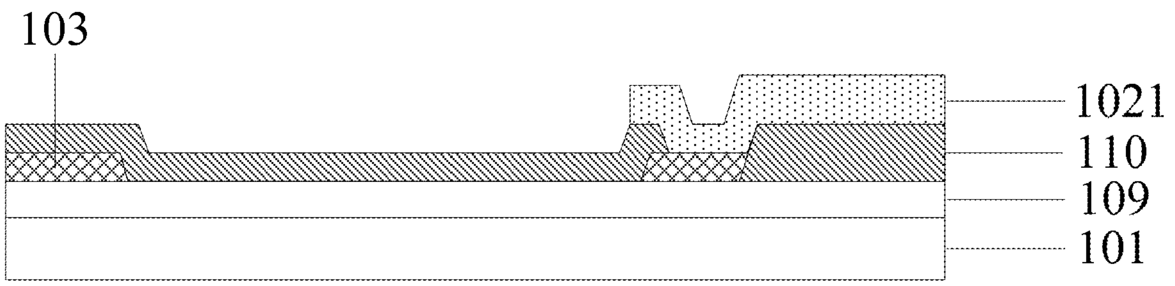
FIG. 17 is a sectional view along VIII-VIII' line in FIG. 16.

In some embodiments, in the detection substrate according to embodiments of the present disclosure, at least one of the gate $g_1$, the first electrode $s_1$ or the second electrode $d_1$ of the first transistor 105 is set absent, which may include the following possibilities: as shown in FIGS. 10 to 11, the gate $g_1$ of the first transistor 105 is electrically connected with the scanning line 104, the first electrode $s_1$ of the first transistor 105 is electrically connected with the first photosensitive device 102, and the second electrode $d_1$ of the first transistor 105 is absent; as shown in FIGS. 12 and 13, the gate $g_1$ of the first transistor 105 is electrically connected with the scanning line 104, the first electrode $s_1$ of the first transistor 105 is absent, and the second electrode $d_1$ of the first transistor 105 is electrically connected with the reading line 103; as shown in FIG. 14 and FIG. 15, the gate $g_1$ of the first transistor 105 is absent, the first electrode $s_1$ of the first transistor 105 is electrically connected with the first photosensitive device 102, and the second electrode $d_1$ of the first transistor 105 is electrically connected with the reading line 103; as shown in FIG. 16 and FIG. 17, the gate $g_1$, the first electrode $s_1$ and the second electrode $d_1$ of the first transistor 105 are all absent. Of course, in actual implementation, any two of the gate $g_1$, the first electrode $s_1$ and the second electrode $d_1$ of the first transistor 105 may also be absent, which is not limited here.

It should be noted that when at least one of the gate $g_1$, the first electrode $s_1$ or the second electrode $d_1$ of the first transistor 105 is set floating or absent, since the first transistor 105 does not need to be turned on, an active layer $a_1$ of a first transistor 105 may exist or be absent, which is not limited here.

In some embodiments, in the detection substrate according to embodiments of the present disclosure, as shown in FIG. 1, the base substrate 101 may further includes a photosensitive region AA, where the noise reduction region BB may be located on at least one side of the photosensitive region AA in an extending direction Y of the reading line 103 (i.e., at least one of the left and right sides). In this case, the first photosensitive device 102 can be arranged in at least one column in the noise reduction region BB on one side (e.g., left or right side) of the photosensitive region AA, a single reading line 103 can be located in the noise reduction region BB or the photosensitive region AA, and each of the scanning lines 104 runs through the photosensitive region AA and the noise reduction region BB, so that each of the reading lines 103 in the noise reduction region BB corresponds to one column of first photosensitive devices 102, each of the reading lines 103 in the photosensitive region AA is electrically connected with one column of second photosensitive devices 106 (located in the photosensitive region AA), and each of the scanning lines 104 corresponds to all first photosensitive devices 102 in a row and is electrically connected with all second photosensitive devices 106 in the row. In this way, the influence of the first photosensitive device 102 can be avoided, so that the signal read by the reading line 103 is completely the coupled noise signal of the scanning line 104.

Figure 18:
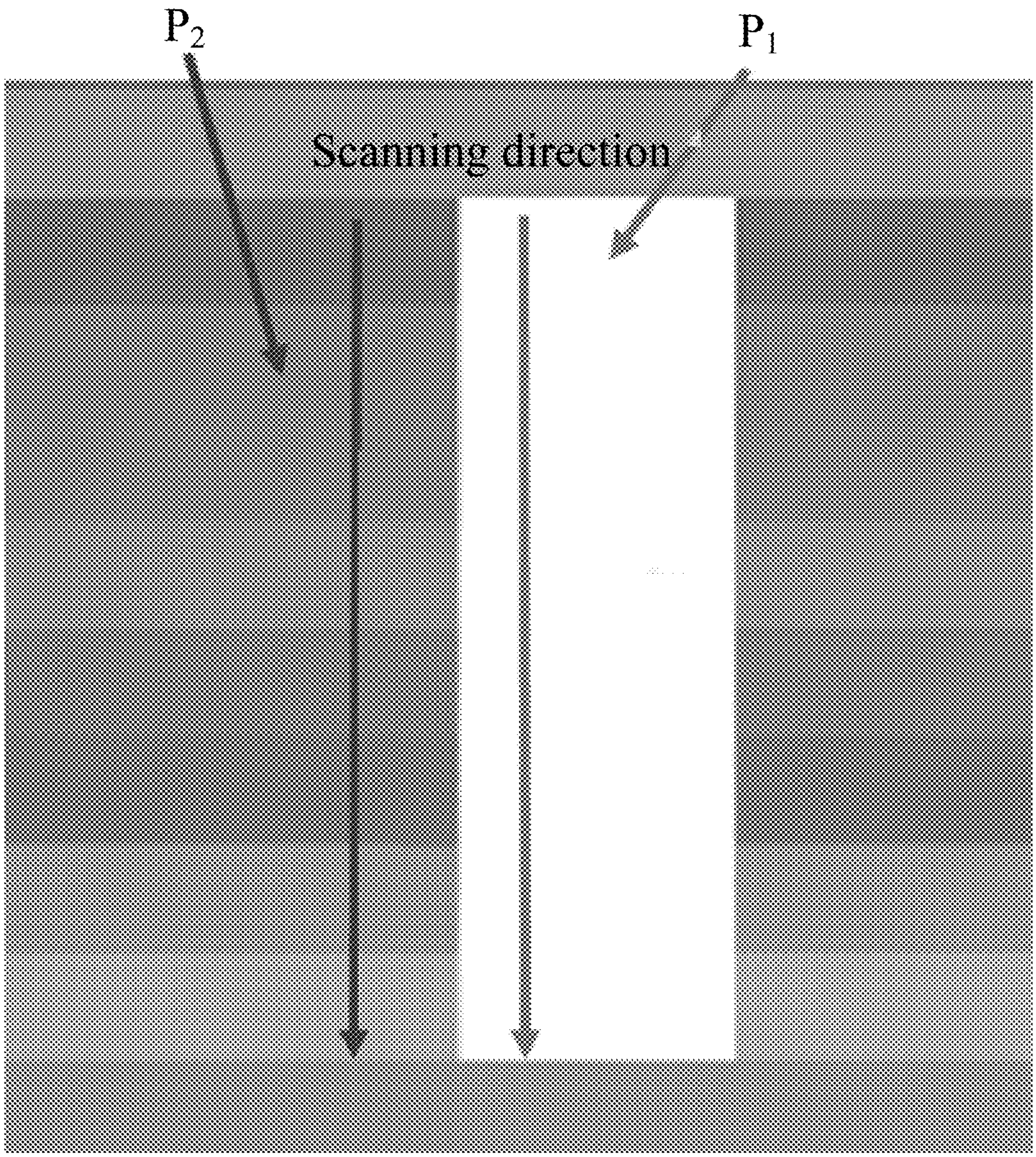
FIG. 18 is a detection image of noise reduction pixels and normal pixels.
Figure 19:
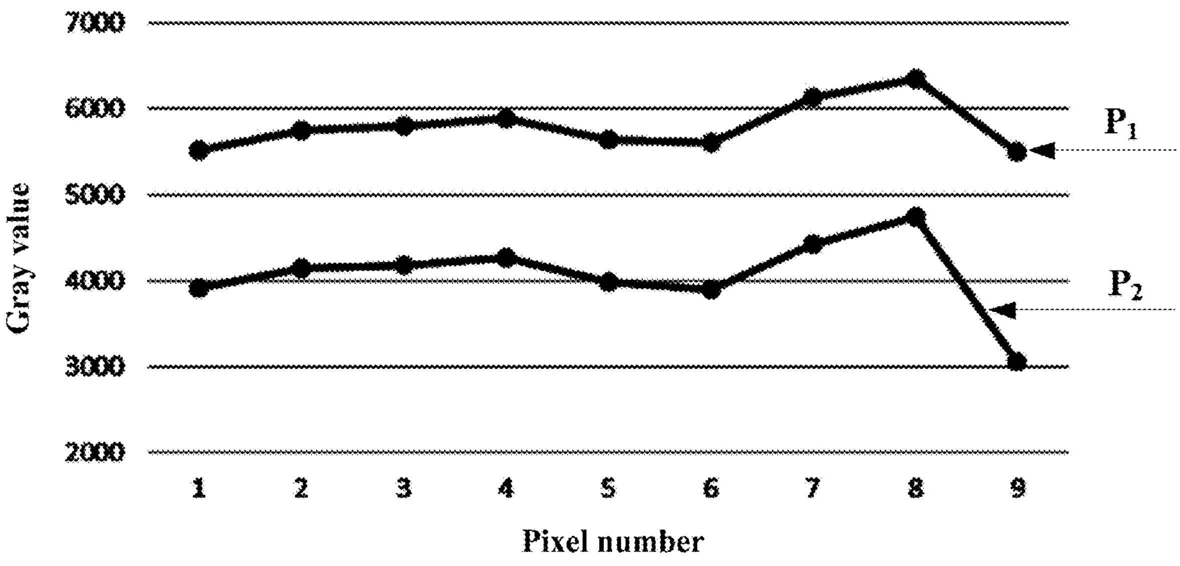
FIG. 19 is a comparison diagram of gray values of noise reduction pixels and the normal pixels.

Correspondingly, embodiments of the present disclosure provide a detection image (as shown in FIG. 18) and a comparison diagram of grayscale values (as shown in FIG. 19) of noise reduction pixels $P_1$ and normal pixels $P_2$ in FIG. 1 and FIG. 2. In a normal pixel, the gate of the transistor is electrically connected with the scanning line 104, the first electrode of the transistor is electrically connected with the photosensitive device, and the second electrode of the transistor is electrically connected with the reading line 103. The pixels in the middle bright part in FIG. 18 are noise reduction pixels $P_1$, and other pixels with lower gray values are normal pixels $P_2$. It can be seen from FIG. 19 that the gray change trend of the noise reduction pixel $P_1$ is consistent with that of the normal pixel $P_2$, indicating that the noise reduction pixel $P_1$ can isolate the influence brought by the first photosensitive device 102, and its pixel value fluctuations all come from the coupled noise signal of the scanning line 104, which can accurately reflect the coupled noise signal of the scanning line 104.

Figure 20:
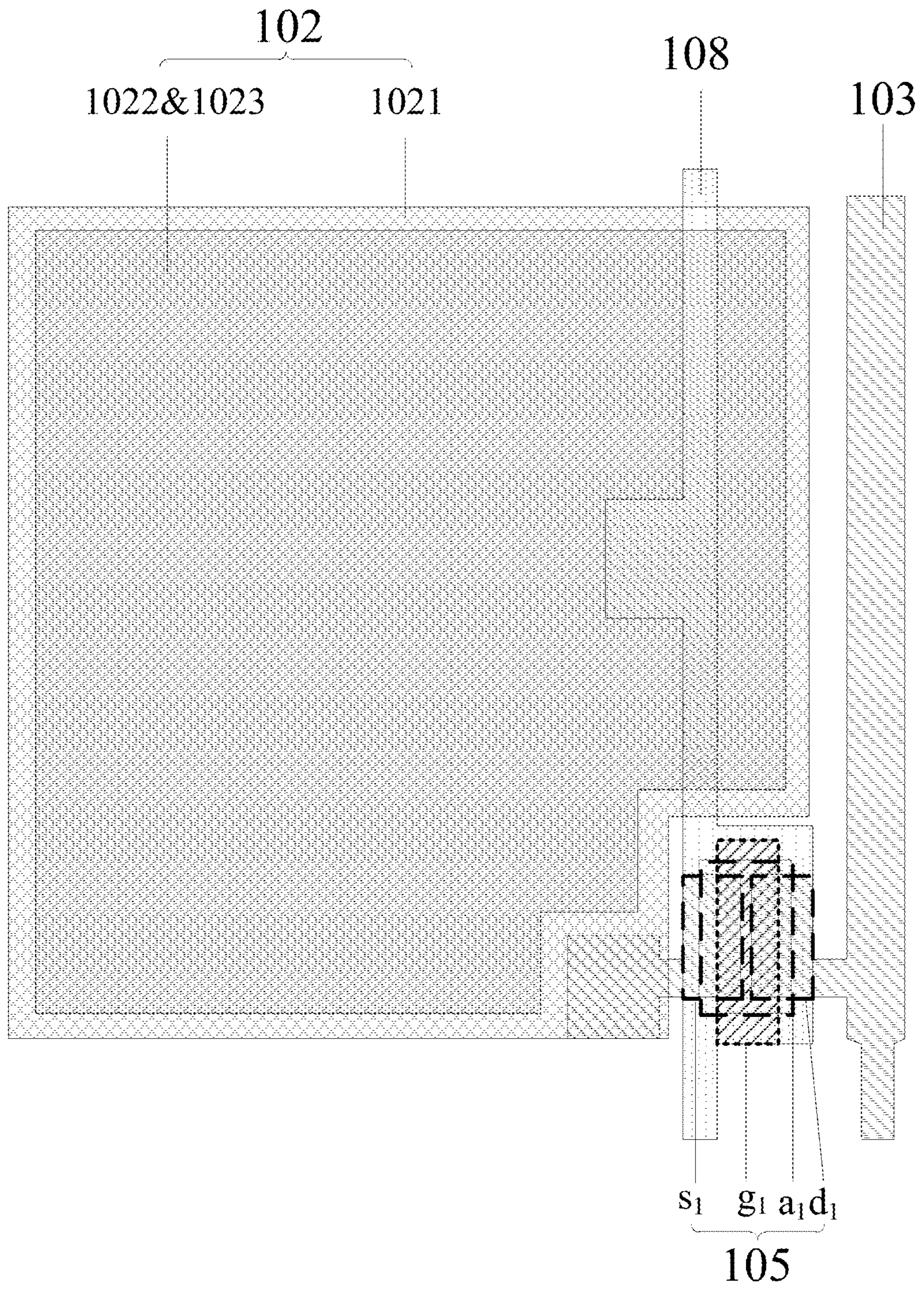
FIG. 20 is a schematic structural diagram of a noise reduction pixel in the noise reduction region in FIG. 1.

In some embodiments, in the detection substrate according to embodiments of the present disclosure, as shown in FIG. 1, the noise reduction region BB can also be arranged on at least one side of the photosensitive region AA in an extending direction X of the scanning line 104 (i.e., at least one of the upper side and the lower side). In this case, the first photosensitive device 102 can be arranged in at least one row in the noise reduction region BB on one side (for example, the upper side or the lower side) of the photosensitive region AA, each of the reading lines 103 all runs through the noise reduction region BB and the photosensitive region AA, and a plurality of scanning lines 104 are all located in the photosensitive region AA, that is, no scanning line 104 is set in the noise reduction region BB on the upper side and/or lower side of the photosensitive region AA (as shown in FIG. 20), so that each of the scanning lines 104 is electrically connected with one row of second photosensitive devices 106, each of the reading lines 103 is electrically connected with all first photosensitive devices 102 and all second photosensitive devices 106 in a column. In this way, the influence of the first photosensitive device 102 and the scanning line 104 can be avoided, so that the reading line 103 only outputs its own noise signal.

Figure 21:
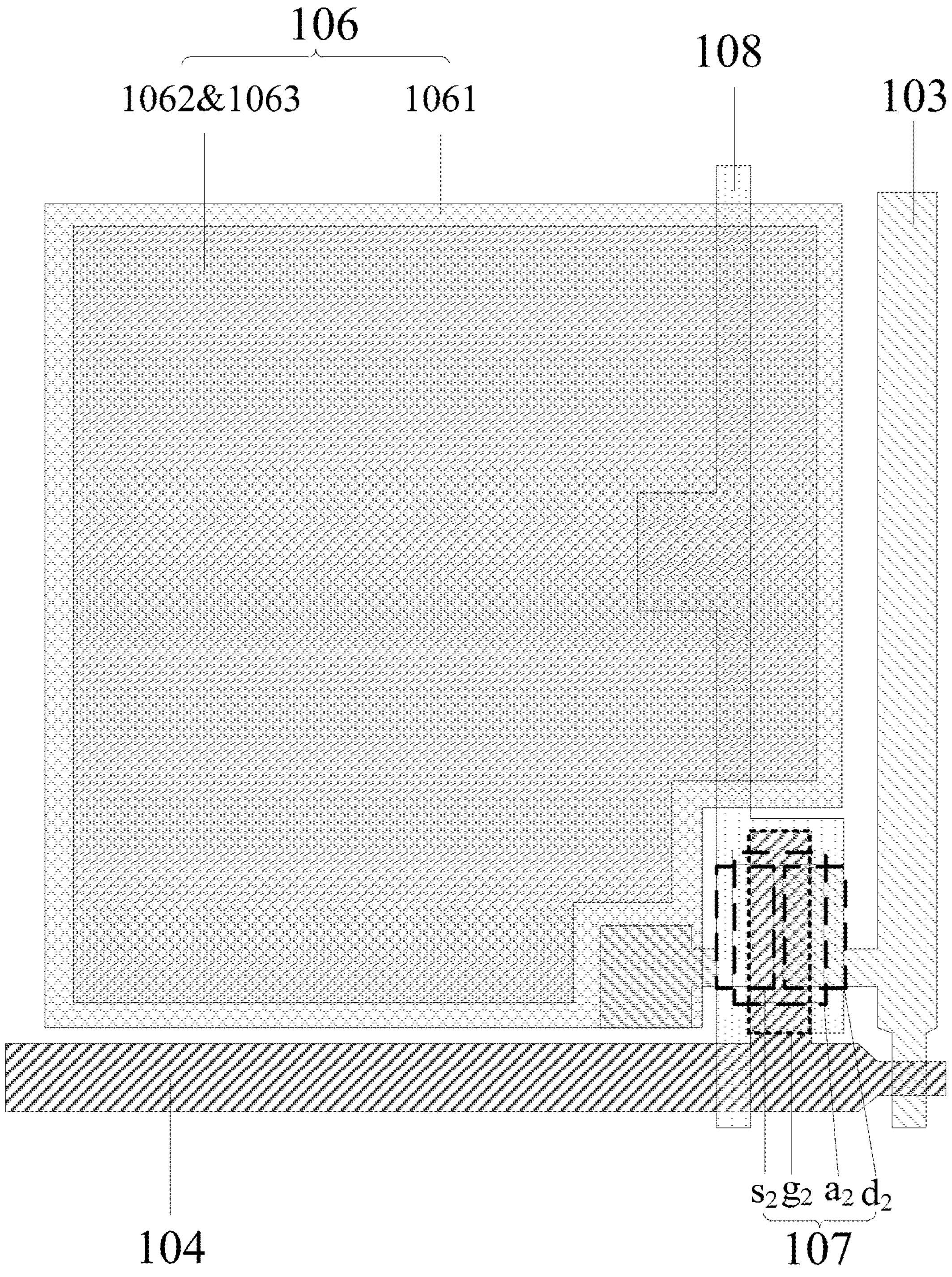
FIG. 21 is a schematic structural diagram of a normal pixel in a photosensitive region in FIG. 1.

In some embodiments, the detection substrate according to embodiments of the present disclosure, as shown in FIG. 21, may further include a plurality of second photosensitive devices 106 and a plurality of second transistors 107 located in the photosensitive region AA. Here, the gate $g_2$ of the second transistor 107 is electrically connected with the scanning line 104, the first electrode $s_2$ of the second transistor 107 is electrically connected with the second photosensitive device 106 (it can be the bottom electrode 1061 of the second photosensitive device 106), and the second electrode $d_2$ of the second transistor 107 is electrically connected with the reading line 103. Optionally, the structure of the second photosensitive device 106 is the same as that of the first photosensitive device 102, and the same functional film layers of the second photosensitive device 106 and the first photosensitive device 102 can be arranged in the same layer, for example, the bottom electrode 1061 of the second photosensitive device 106 is set on the same layer as the bottom electrode 1021 of the first photosensitive device 102, the photoelectric conversion structure 1062 of the second photosensitive device 106 is set on the same layer as the photoelectric conversion structure 1022 of the first photosensitive device 102, and the top electrode 1063 of the second photosensitive device 106 and the top electrode 1023 of the first photosensitive device 102 are arranged on the same layer; the second transistor 107 has the same structure as the first transistor 105, and the same functional film layers of the second transistor 107 and the first transistor 105 can be arranged on the same layer, for example, the gate $g_2$ of the second transistor 107 is set on the same layer as the gate g1 of the first transistor 105, the first electrode $s_2$ of the second transistor 107 is set on the same layer as the first electrode $s_1$ of the first transistor 105, and the second electrode $d_2$ of the second transistor 107 is set on the same layer as the second electrode $d_1$ of the first transistor 105, so as to reduce the number of masking times and the number of film layers, save manufacturing cost, and improve production efficiency.

In some embodiments, in the detection substrate according to embodiments of the present disclosure, as shown in FIG. 2, FIG. 4, FIG. 6, FIG. 8, FIG. 10, FIG. 12, FIG. 14, FIG. 16, FIG. 19 and FIG. 21, the detection substrate may also include a bias line 108, an extending direction of the bias line 108 may be the same as the extending direction of the reading line 103, and the bias line 108 is electrically connected with the top electrode 1023 of the first photosensitive device 102 or the top electrode 1023 of the second photosensitive device 106. It should be understood that since the first photosensitive device 102 in the noise reduction region BB does not need to be loaded with a bias voltage, in some embodiments, the bias line 108 in the noise reduction region BB can be omitted. In addition, as shown in FIG. 21, the bias line 108 may have a protruding portion that shields the second transistor 107, so as to prevent light from irradiating the active layer a2 of the second transistor 107 and causing the leakage current in the second transistor 107.

Generally, in the detection substrate according to embodiments of the present disclosure, as shown in FIG. 3, FIG. 5, FIG. 7, FIG. 9, FIG. 11, FIG. 13, FIG. 15 and FIG. 17, the detection substrate further includes a gate insulating layer 109, a passivation layer 110, etc.

Other essential components of the detection substrate should be understood by those of ordinary skill in the art and are not described herein, nor should they be used as a limitation on the present disclosure.

Based on the same inventive concept, embodiments of the present disclosure provide a noise reduction method for the detection substrate according to embodiments of the present disclosure. Since the problem-solving principle of the noise reduction method is similar to the problem-solving principle of the above-mentioned detection substrate, the implementation of the noise reduction method can refer to the above-mentioned embodiments of the detection substrate, and repeated descriptions will not be repeated.

Figure 22:
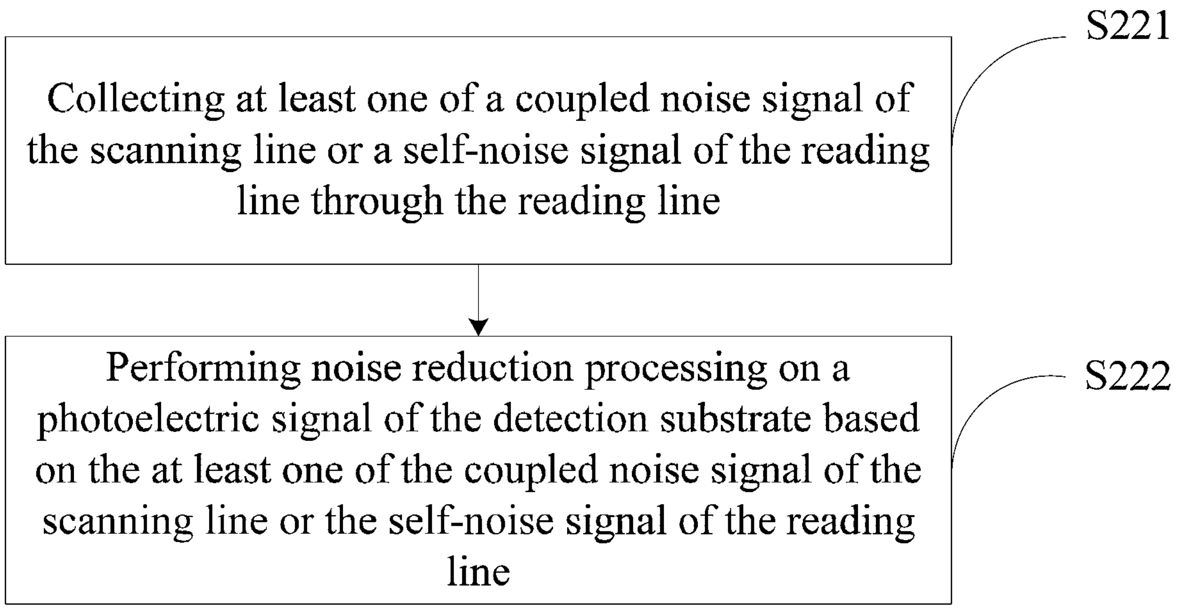
FIG. 22 is a flowchart of a noise reduction method for a detection substrate according to an embodiment of the present disclosure.

The noise reduction method of the detection substrate according to embodiments of the present disclosure, as shown in FIG. 22, may include the following steps.

S221, collecting at least one of a coupled noise signal of the scanning line or a self-noise signal of the reading line through the reading line. When collecting the coupled noise signal of the scanning line and the self-noise signal of the reading line, the scanning line controls the second transistor to be in an off state, so as to ensure that the reading line collects only noise signals without photoelectric signals.

S222, performing noise reduction processing on a photoelectric signal of the detection substrate based on the at least one of the coupled noise signal of the scanning line or the self-noise signal of the reading line. In some embodiments, the photoelectric signal of the detection substrate can be equivalent to the photoelectric signal of the second photosensitive device, the second transistor can be controlled to be in an on state through the scanning line, so that the photoelectric signal of the second photosensitive device can be transmitted to the reading line via the second transistor for collecting. Subsequently, an image processing algorithm in the related art may be used to perform noise reduction processing on the photoelectric signal of the second photosensitive device.

Based on the same inventive concept, an embodiment of the present disclosure provides a detection device, including the above-mentioned detection substrate according to embodiments of the present disclosure. Since the problem-solving principle of the detection device is similar to the problem-solving principle of the above-mentioned detection substrate, the implementation of the detection device can refer to the above-mentioned embodiments of the detection substrate, and the repetition will not be repeated.

In some embodiments, the detection device according to embodiments of the present disclosure can be used for X-ray detection and imaging, or for identifying fingerprints, palm prints and other lines. In addition, other essential components in the detection device should be understood by those of ordinary skill in the art, and will not be repeated here, nor should they be used as a limitation on the present disclosure.

Although embodiments of the present disclosure have been described, those skilled in the art can make various changes and modifications to the embodiments of the present disclosure without departing from the spirit and scope of the embodiments of the present disclosure. In this way, if these modifications and variations of the embodiments of the present disclosure fall within the scope of the claims of the present disclosure and their equivalent technologies, the present disclosure also intends to include these modifications and variations.

What is claimed is:

1. A detection substrate, comprising:

a base substrate, comprising a noise reduction region;

a plurality of first photosensitive devices in the noise reduction region;

a plurality of reading lines and a plurality of scanning lines, wherein the plurality of reading lines and the plurality of scanning lines are arranged in different layers from the plurality of first photosensitive devices, and the plurality of reading lines and the plurality of scanning lines are in different layers and crossing over each other; and a plurality of first transistors in the noise reduction region, wherein the first transistor is disconnected from at least one of the first photosensitive device, the reading line or the scanning line;

wherein at least one of a gate, a first electrode or a second electrode of the first transistor is floating.

2. The detection substrate according to claim 1, wherein the gate of the first transistor is electrically connected with the scanning line, the first electrode of the first transistor is electrically connected with the first photosensitive device, and the second electrode of the first transistor is floating.

3. The detection substrate according to claim 1, wherein the gate of the first transistor is electrically connected with the scanning line, the first electrode of the first transistor is floating, and the second electrode of the first transistor is electrically connected with the reading line.

4. The detection substrate according to claim 1, wherein the gate of the first transistor is floating, the first electrode of the first transistor is electrically connected with the first photosensitive device, and the second electrode of the first transistor is electrically connected with the reading line.

5. The detection substrate according to claim 4, wherein the base substrate further comprises a photosensitive region, and the noise reduction region is located on at least one side of the photosensitive region in an extending direction of the scanning line;

each of the reading lines runs through the noise reduction region and the photosensitive region, and the plurality of scanning lines are located in the photosensitive region.

6. The detection substrate according to claim 1, wherein the gate, the first electrode and the second electrode of the first transistor are all floating.

7. The detection substrate according to claim 1, wherein the base substrate further comprises a photosensitive region, and the noise reduction region is located on at least one side of the photosensitive region in an extending direction of the reading line;

a single reading line is located in the noise reduction region or the photosensitive region, and each of the scanning lines runs through the photosensitive region and the noise reduction region.

8. The detection substrate according to claim 7, further comprising a plurality of second photosensitive devices and a plurality of second transistors in the photosensitive region, wherein a gate of the second transistor is electrically connected with the scanning line, a first electrode of the second transistor is electrically connected with the second photosensitive device, and a second electrode of the second transistor is electrically connected with the reading line.

9. A noise reduction method for the detection substrate according to claim 1, comprising:

collecting at least one of a coupled noise signal of the scanning line or a self-noise signal of the reading line through the reading line; and performing noise reduction processing on a photoelectric signal of the detection substrate based on the at least one of the coupled noise signal of the scanning line and the self-noise signal of the reading line.

10. A detection device, comprising the detection substrate according to claim 1.

11. A detection substrate, comprising:

a base substrate, comprising a noise reduction region;

a plurality of first photosensitive devices in the noise reduction region;

a plurality of reading lines and a plurality of scanning lines, wherein the plurality of reading lines and the plurality of scanning lines are arranged in different layers from the plurality of first photosensitive devices, and the plurality of reading lines and the plurality of scanning lines are in different layers and crossing over each other; and a plurality of first transistors in the noise reduction region, wherein the first transistor is disconnected from at least one of the first photosensitive device, the reading line or the scanning line;

wherein at least one of the gate, the first electrode or the second electrode of the first transistor is absent.

12. The detection substrate according to claim 11, wherein the gate of the first transistor is electrically connected with the scanning line, the first electrode of the first transistor is electrically connected with the first photosensitive device, and the second electrode of the first transistor is absent.

13. The detection substrate according to claim 11, wherein the gate of the first transistor is electrically connected with the scanning line, the first electrode of the first transistor is absent, and the second electrode of the first transistor is electrically connected with the reading line.

14. The detection substrate according to claim 11, wherein the gate of the first transistor is absent, the first electrode of the first transistor is electrically connected with the first photosensitive device, and the second electrode of the first transistor is electrically connected with the reading line.

15. The detection substrate according to claim 11, wherein the gate, the first electrode and the second electrode of the first transistor are all absent.

16. The detection substrate according to claim 11, wherein the base substrate further comprises a photosensitive region, and the noise reduction region is located on at least one side of the photosensitive region in an extending direction of the reading line;

a single reading line is located in the noise reduction region or the photosensitive region, and each of the scanning lines runs through the photosensitive region and the noise reduction region.

17. The detection substrate according to claim 16, further comprising a plurality of second photosensitive devices and a plurality of second transistors in the photosensitive region, wherein a gate of the second transistor is electrically connected with the scanning line, a first electrode of the second transistor is electrically connected with the second photosensitive device, and a second electrode of the second transistor is electrically connected with the reading line.

18. A noise reduction method for the detection substrate according to claim 11, comprising:

collecting at least one of a coupled noise signal of the scanning line or a self-noise signal of the reading line through the reading line; and performing noise reduction processing on a photoelectric signal of the detection substrate based on the at least one of the coupled noise signal of the scanning line and the self-noise signal of the reading line.

19. A detection device, comprising the detection substrate according to claim 11.

* * * * *